(12) United States Patent
Chang et al.

(10) Patent No.: US 11,520,933 B2
(45) Date of Patent: Dec. 6, 2022

(54) MEMORY CHIP HAVING SECURITY VERIFICATION FUNCTION AND MEMORY DEVICE

(71) Applicant: MACRONIX INTERNATIONAL CO., LTD., Hsinchu (TW)

(72) Inventors: Kuen-Long Chang, Taipei (TW); Chia-Jung Chen, Zhubei (TW); Chin-Hung Chang, Tainan (TW); Ken-Hui Chen, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 370 days.

(21) Appl. No.: 16/726,284

(22) Filed: Dec. 24, 2019

(65) Prior Publication Data
US 2020/0242273 A1 Jul. 30, 2020

Related U.S. Application Data

(60) Provisional application No. 62/798,494, filed on Jan. 30, 2019.

(51) Int. Cl.
*G06F 21/72* (2013.01)
*G06F 21/62* (2013.01)
*G06F 12/1009* (2016.01)

(52) U.S. Cl.
CPC .......... *G06F 21/72* (2013.01); *G06F 12/1009* (2013.01); *G06F 21/6218* (2013.01)

(58) Field of Classification Search
CPC ...... G06F 21/72; G06F 21/6218; G06F 21/79; G06F 21/78; G06F 21/602;
(Continued)

(56) References Cited

U.S. PATENT DOCUMENTS 7,562,388 B2 7/2009 Hackenberger et al.
10,983,711 B2 * 4/2021 Shan ................... G06F 12/1408
(Continued)

FOREIGN PATENT DOCUMENTS

CN 106708631 A 5/2017
WO 2014150339 A2 9/2014

OTHER PUBLICATIONS

TW Office Action dated Dec. 29, 2020 in Taiwan application (No. 108147352).

*Primary Examiner* — Han Yang
(74) *Attorney, Agent, or Firm* — McClure, Qualey & Rodack, LLP

(57) ABSTRACT

A memory chip comprises a first memory controller, a first data storage zone, a security unit and an address configuration unit. The first data storage zone is coupled to the first memory controller, and represented by a first physical address range. The security unit is coupled to the first memory controller. The address configuration unit is coupled to the first memory controller. The memory chip is configured to be coupled between a host controller and another memory chip. The another memory chip comprises a second data storage zone represented by a second physical address range. The address configuration unit records one or more relationships of a logical address range corresponding to the first physical address range and the second physical address range. The security unit is configured to encrypt and decrypt data in the first data storage zone and the second data storage zone.

21 Claims, 6 Drawing Sheets

(58) Field of Classification Search
CPC ......... G06F 12/1009; G06F 2212/1052; G06F 2212/7201; G06F 2212/7204; G06F 2212/7206; G06F 3/062; G06F 3/0644; G06F 3/0658; G06F 12/0653; G06F 12/1408; G06F 12/1441; G06F 12/0238; G06F 12/0284; G06F 12/0292
See application file for complete search history.

(56) References Cited

U.S. PATENT DOCUMENTS

| | | | |
|---|---|---|---|
| 2014/0281499 A1* | 9/2014 | Schentrup | G06F 21/606 713/193 |
| 2019/0212930 A1* | 7/2019 | Qian | G06F 3/0644 |

* cited by examiner

MEMORY CHIP HAVING SECURITY VERIFICATION FUNCTION AND MEMORY DEVICE

This application claims the benefit of U.S. provisional application Ser. No. 62/798,494, filed Jan. 30, 2019, the subject matter of which is incorporated herein by reference.

BACKGROUND OF THE INVENTION

Field of the Invention

The invention relates to a memory chip having security function and a memory device.

Description of the Related Art

Modern people are paying more and more attention to personal privacy. In order to meet the needs of users, memory devices add a mechanism for security to memory chips. However, the addition of a secure function to memory chips necessitates the addition of additional circuitry, which in turn increases the cost. In view of the above, how to let the memory chips in a memory device have the security function without increasing excessive cost, which is one of the issues of the industry.

SUMMARY OF THE INVENTION

An embodiment of the present invention discloses a memory device comprising a first memory chip and a second memory chip. The first memory chip is configured to be coupled to a host controller. The first memory chip comprises a first memory controller, a first data storage zone, a security unit and an address configuration unit. The first data storage zone is coupled to the first memory controller, and represented by a first physical address range. The security unit is coupled to the first memory controller. The address configuration unit is coupled to the first memory controller. The second memory chip is coupled to the first memory controller, and configured to be coupled to the host controller via the first memory chip. The second memory chip comprises a second memory controller and a second data storage zone. The second data storage zone is coupled to the second memory controller, and represented by a second physical address range. The address configuration unit records one or more relationships of a logical address range corresponding to the first physical address range and the second physical address range. The security unit is configured to encrypt and decrypt data in the first data storage zone and the second data storage zone.

Another embodiment of the present invention discloses a memory chip comprising a first memory controller, a first data storage zone, a security unit and an address configuration unit. The first data storage zone is coupled to the first memory controller, and represented by a first physical address range. The security unit is coupled to the first memory controller. The address configuration unit is coupled to the first memory controller. The memory chip is configured to be coupled between a host controller and another memory chip. The another memory chip comprises a second data storage zone. The second data storage zone is represented by a second physical address range. The address configuration unit records one or more relationships of a logical address range corresponding to the first physical address range and the second physical address range. The security unit is configured to encrypt and decrypt data in the first data storage zone and the second data storage zone.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
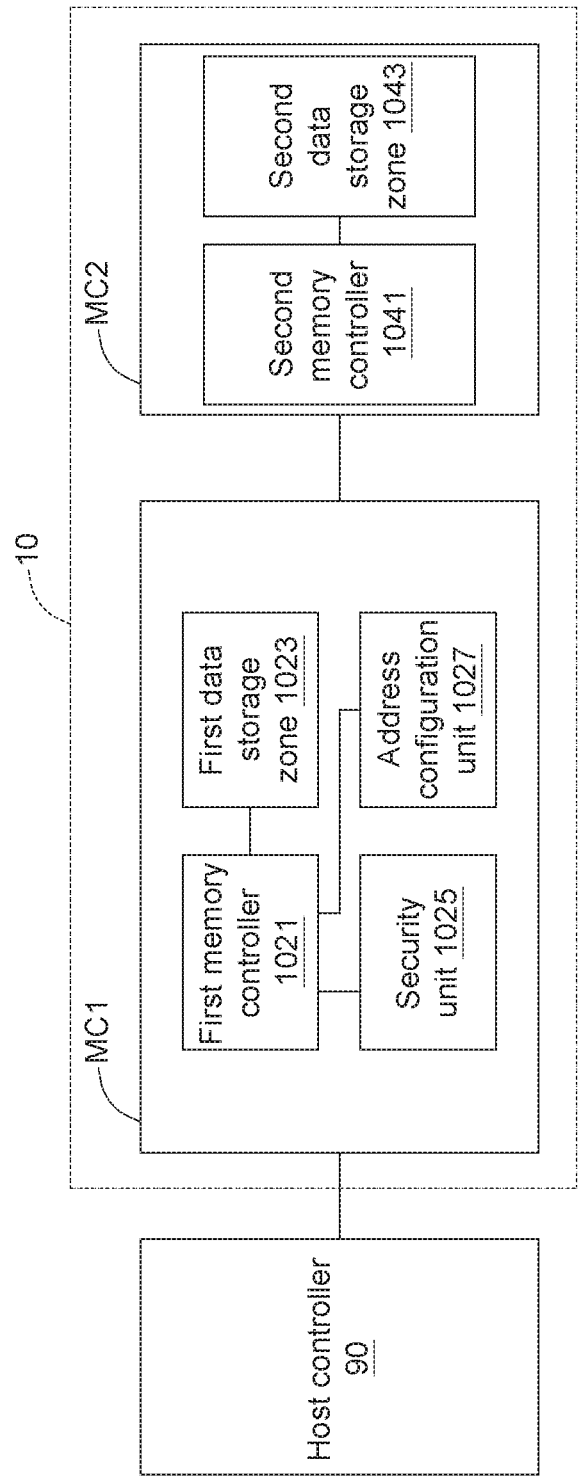
FIG. 1 shows a block diagram of a memory device according to an embodiment of the present invention.

Referring to FIG. 1, FIG. 1 shows a block diagram of a memory device according to an embodiment of the present invention. The memory device 10 includes a first memory chip MC1 and a second memory chip MC2. The first memory chip MC1 is configured to be coupled to a host controller 90, wherein the host controller 90 is, for example, a central processing unit (CPU), a general purpose processing chip or a specific purpose IC chip. The second memory chip MC2 is coupled to the first memory chip MC1. That is, the second memory chip MC2 is indirectly coupled to the host controller 90 via the first memory chip MC1. In an embodiment, the first memory chip MC1 and the second memory chip MC2 may be packaged in a multi-chip package.

The first memory chip MC1 includes a first memory controller 1021, a first data storage zone 1023, a security unit 1025 and an address configuration unit 1027. The first memory chip MC1 may be a specific purpose controlling circuit for implementing controls of interface protocol, internal state machine and so on. When the first memory chip MC1 receives an operation command, for example, a write command or a read command, from the host controller 90, the first memory controller 1021 may perform a corresponding operation in response to the operation command from the host controller 90. The first data storage zone 1023 is coupled to the first memory controller 1021, and may be represented by a first physical address range, for storing data. The security unit 1025 is coupled to the first memory controller 1021, and may be specific circuitry for implementing a security algorithm such as Advanced Encryption Standard (AES), Elliptic Curve Diffie-Hellman key Exchange (ECDH), Keyed-hash message authentication code (HMAC), Secure Hash Algorithms (SHA). The security unit 1025 may be configured to encrypt and/or decrypt data in the first data storage zone, and/or check data integrity. In an exemplary embodiment, the security unit 1025 may be a message authentication engine, including logic to compute a value to be matched with the received message authentication code using all or part of the received command sequence and a stored message authentication parameter associated with the identified memory zone (e.g., the first data storage zone 1023 and the second data storage zone 1043), and to prevent completion of the memory operation identified by the command sequence if the value computed does not match the received message authentication code. The address configuration unit 1027 is coupled to the first memory controller 1021, and the detail may be described below.

The second memory chip MC2 includes a second memory controller 1041 and a second data storage zone 1043. The second memory controller 1041 may be specific purpose circuitry for implementing controls of interface protocol, internal state machine and so on. When the second memory chip MC2 receives an operation command, for example, a write command or a read command, transmitted from the host controller 90 via the first memory chip MC1, the second memory controller 1041 may perform a corresponding operation in response to the operation command transmitted from the host controller 90 via the first memory chip MC1. The second data storage zone 1043 is coupled to the second memory controller 1041, and may be represented by a second physical address range, for storing data.

The address configuration unit 1027 is coupled to the first memory controller 1021. The address configuration unit 1027 may be a programmable read-only memory, a register, a static random access memory (SRAM) or a non-volatile memory and so on. The address configuration unit 1027 may be configured to record one or more mapping relationships of a logical address range corresponding to the first physical address range and the second physical address range. In an embodiment, the address configuration unit 1027 includes a mapping table, the mapping table includes the one or more mapping relationships of the logical address range corresponding to the first physical address range and the second physical address range. For example, when the first memory chip MC1 receives a read command and a logical address from the host controller 90, the first memory controller 1021 may map the logical address to a physical address within the first physical address range or the second physical address range according to the mapping table of the address configuration unit 1027. When the logical address is mapped to a physical address within the first physical address range, the first memory controller 1021 access the first data storage zone 1023 according to the mapped physical address, and the read data may be encrypted/decrypted by the security unit 1025 and transmitted to the host controller 90. When the logical address is mapped to a physical address within the second physical address range, the first memory controller 1021 transmits the read command and the mapped physical address to the second memory chip MC2. Then, the second memory controller 1041 may access the second data storage zone 1043 according to the mapped physical address. The read data may be transmitted to the first memory chip MC1, and may be encrypted/decrypted by the security unit 1025 and transmitted to the host controller 90.

Figure 2A:
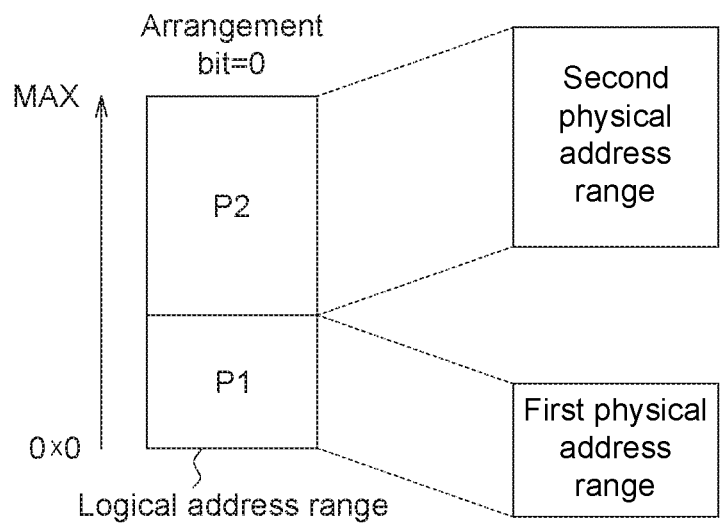
FIGS. 2A-2C show scheme diagrams of mapping relationship of a logical address range corresponding to the first physical address range and the second physical address range.
Figure 2B:
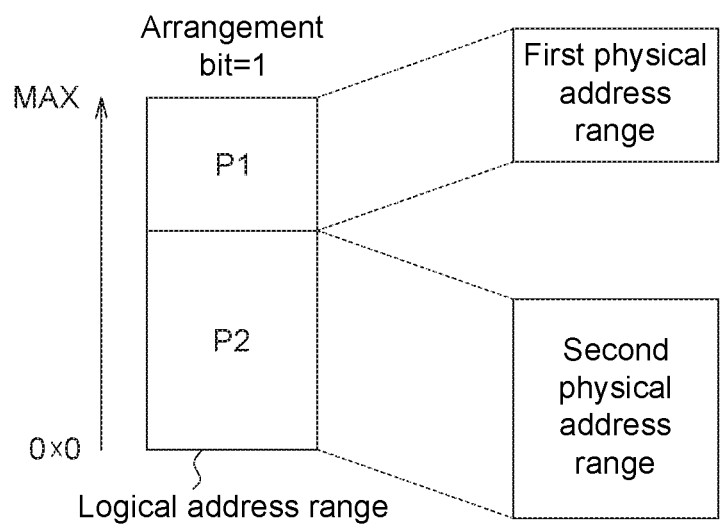
Figure 2C:
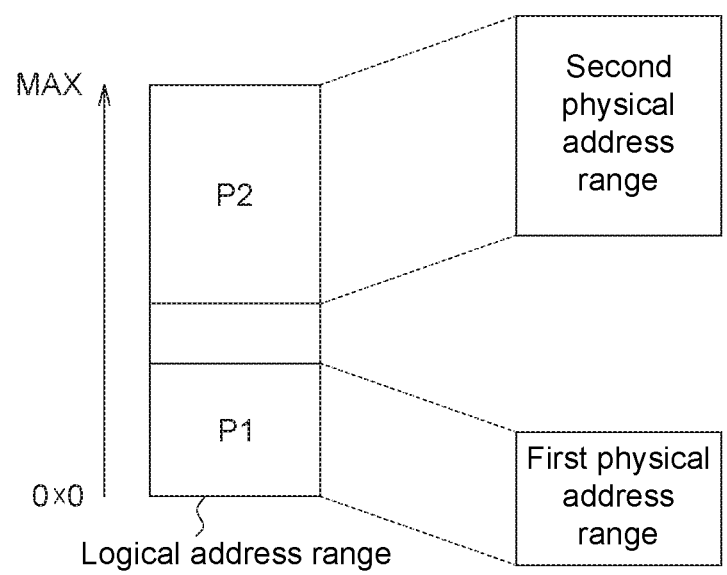

Referring to FIGS. 2A-2C, FIGS. 2A-2C show scheme diagrams of the mapping relationship of the logical address range corresponding to the first physical address range and the second physical address range. In the configuration shown in FIG. 2A, a first portion P1 of the logical address range is mapped to the first physical address range, and a second portion P2 of the logical address range is mapped to the second physical address range, wherein the logical addresses within the first portion P1 of the logical address range are lower than the logical addresses within the second portion P2 of the logical address range. In the configuration shown in FIG. 2B, a first portion of the logical address range P1 is mapped to the second physical address range, and a second portion P2 of the logical address range is mapped to the first physical address range, wherein the logical addresses within the first portion P1 of the logical address range are lower than the logical addresses within the second portion P2 of the logical address range. In an embodiment, the mapping table of the address configuration unit 1027 may record one of the mapping relationships shown in FIG. 2A and FIG. 2B. In another embodiment, the mapping table of the address configuration unit 1027 may record both of the mapping relationships shown in FIG. 2A and FIG. 2B. In an embodiment that the mapping table records two or more mapping relationships, one or more arrangement bits of the logical address may be configured to represent a type of the relationship. For example, in the embodiment that the mapping table records both of the mapping relationships shown in FIG. 2A and FIG. 2B, the most significant bit of a logical address is configured to be the arrangement bit. When the most significant bit of a logical address is 0, the mapping relationship is the mapping relationship shown in FIG. 2A, and when the most significant bit of a logical address is 1, the mapping relationship is the mapping relationship shown in FIG. 2B.

In the configuration shown in FIG. 2C, a first portion P1 of the logical address range is mapped to the first physical address range, and a second portion P2 of the logical address range is mapped to the second physical address range, wherein the logical addresses within the first portion P1 of the logical address range are lower than the logical addresses within the second portion P2 of the logical address range, and the first portion P1 and the second portion are not continuous.

Figure 3:
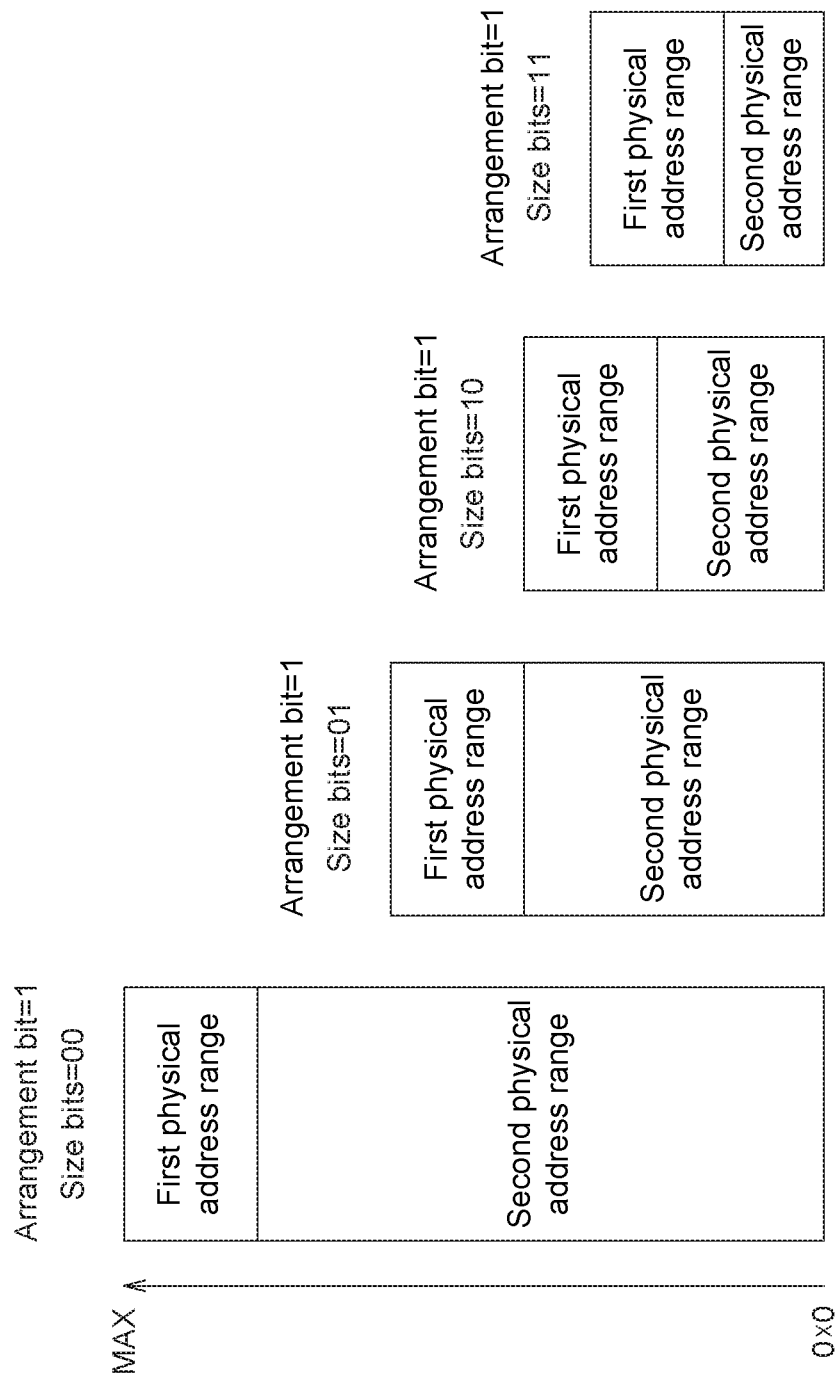
FIG. 3 shows scheme diagrams of mapping relationship of a logical address range corresponding to the first physical address range and the second physical address range.

Referring to FIG. 3, FIG. 3 shows scheme diagram of mapping relationships of the logical address range corresponding to the first physical address range and the second physical address range. In This embodiment, the logical addresses within the logical address range further includes one or more size bit for representing a size of the second data storage zone 1043. FIG. 3 shows examples for four mapping relationships corresponding to four different size of the second data storage zone according to an exemplary embodiment of the present invention. Two bits of the logical address are configured to be the size bits for representing the size of the second data storage zone. When the size bits are 00, the size of the second data storage zone is 1 Gb, when the size bits are 01, the size of the second data storage zone is 512 Mb, when the size bits are 10, the size of the second data storage zone is 256 Mb, and when the size bits are 11, the size of the second data storage zone is 128 Mb.

Figure 4:
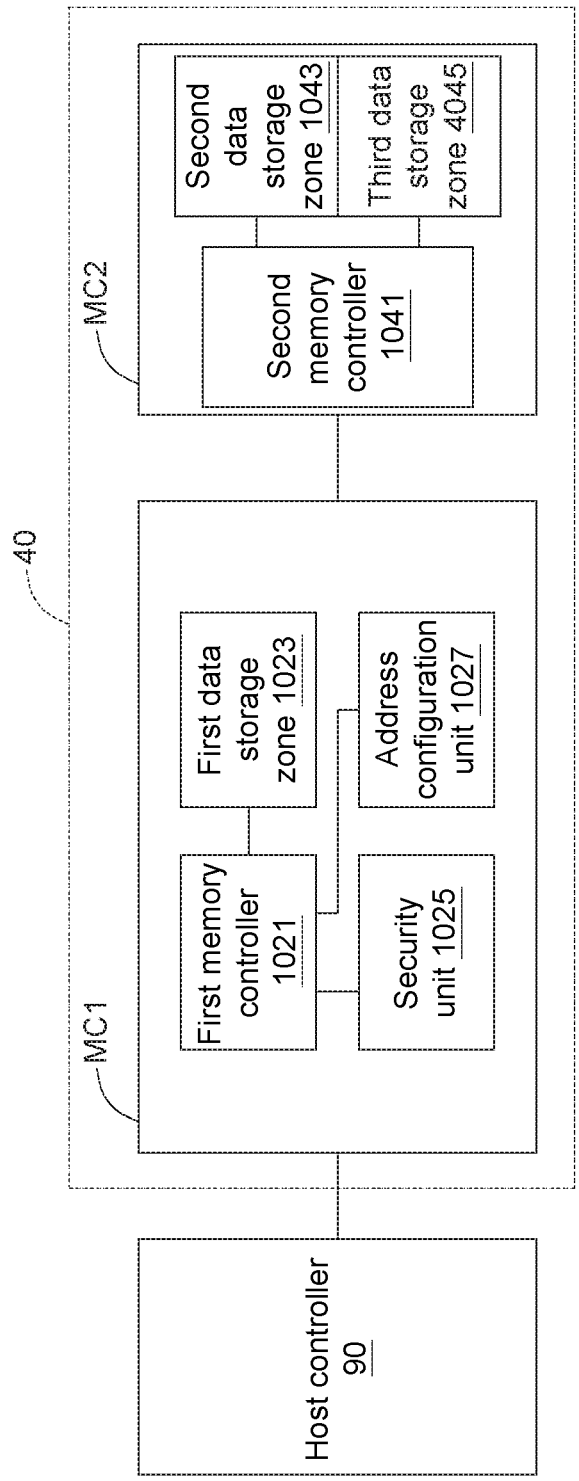
FIG. 4 shows a block diagram of a memory device according to another embodiment of the present invention.
Figure 5:
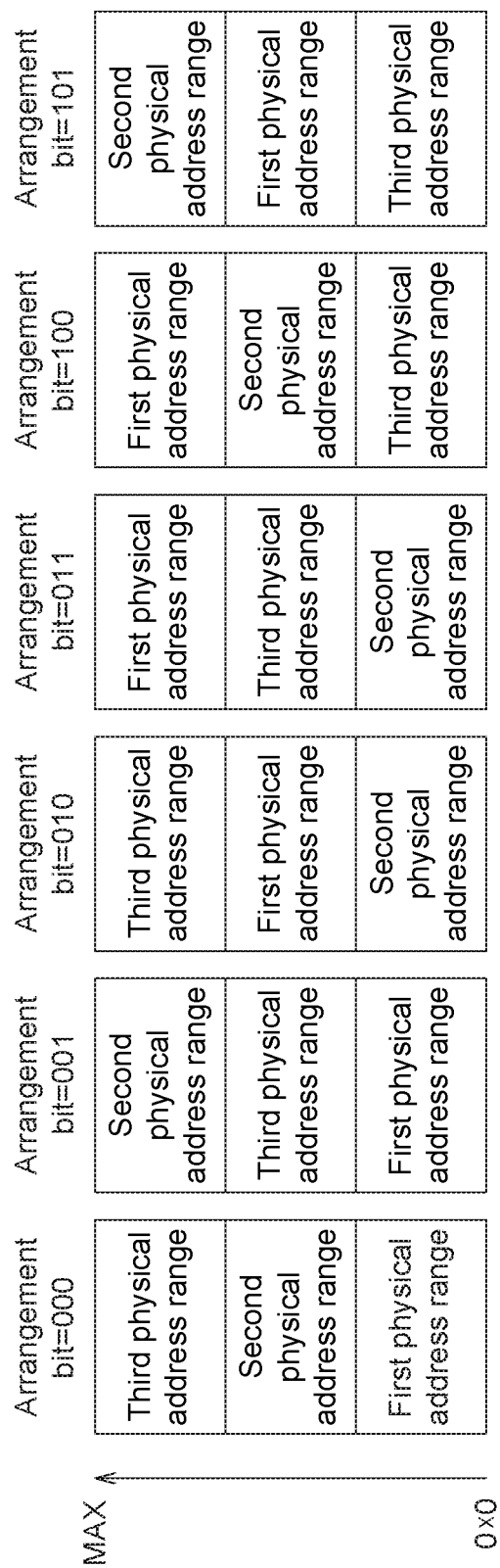
FIG. 5 shows scheme diagrams of mapping relationship of a logical address range corresponding to a number of physical address ranges.

As shown in FIG. 4, in another embodiment, the second memory chip MC2 of the memory device 40 may further includes a third data storage zone 4045, wherein the third data storage zone 4045 may be represented by a third physical address range. As shown in FIG. 5, the logical addresses within the logical address range may include three arrangement bits. When the arrangement bits are 000, the logical addresses within the logical address range are mapped from low to high orderly to the first physical address range, the second physical address range and the third physical address range; when the arrangement bits are 001, the logical addresses within the logical address range are mapped from low to high orderly to the first physical address range, the third physical address range and the second physical address range; when the arrangement bits are 010, the logical addresses within the logical address range are mapped from low to high orderly to the second physical address range, the first physical address range and the third physical address range; when the arrangement bits are 011, the logical addresses within the logical address range are mapped from low to high orderly to the second physical address range, the third physical address range and the first physical address range; when the arrangement bits are 100, the logical addresses within the logical address range are mapped from low to high orderly to the third physical address range, the second physical address range and the first physical address range; and when the arrangement bits are 101, the logical addresses within the logical address range are mapped from low to high orderly to the third physical address range, the first physical address range and the second physical address range.

In an embodiment, the mapping relationship of the logical address range corresponding to the physical address ranges (e.g., the first physical address range, second physical address range and so on) used by the memory device 10 may be fixed when the memory device 10 when leaves the factory and cannot be changed by a user. In an embodiment, the mapping relationship of the logical address range corresponding to the physical address ranges (e.g., the first physical address range, second physical address range and so on) used by the memory device 10 may be set dynamically during operation or changed by a user.

The first memory chip MC1 and the second memory chip MC2 may be a Dynamic Random Access Memory (DRAM) or Static Random Access Memory (SRAM) flash memory chip, an erasable programmable read only memory (EPROM) chip, a resistive random-access memory (Re-RAM) chip, a phase-change memory (PCM) chip or other type non-volatile memory chip, according to the design requirements.

In an alternative embodiment, the present invention may be implemented by a memory chip comprising a first memory chip and one or more second memory chips. The first memory chip comprises a first interface, a first controller circuit, a first memory zone and a security unit. The first interface is configured to receive a command sequence from a host device, and to identify a memory operation, for example, a write operation or a read operation. The first controller circuit is operatively coupled to the first interface. The first controller circuit is configured to decode the command sequence. The first memory zone is coupled to the first interface and the first controller circuit. The security unit is operatively coupled to the first interface, and is configured to verify the memory operation. Each of the one or more memory chips comprises a second interface and a second memory zone. The second interface is coupled to the first interface. The second memory zone is coupled the second interface. In this embodiment, the first interface is used for communicating with the host device and the second memory chip(s), and the second interface is used for communicating with the first memory chip. The first interface identifies a target memory zone from the command sequence for directing the memory operation to one of the first memory zone and the one or more second memory zone according to one or more relationships of a logical address range corresponding to a first physical address range representing the first memory zone and one or more second physical address ranges representing the one or more second memory zones. The first controller circuit executes the memory operation based on the target memory zone.

According to the present invention, in a multi-chip memory device, the security unit may be configured in one of the memory chips, and the other memory chips are configured to be indirectly coupled to the host controller via the memory chip having the security unit. All the memory chips in the memory device may be able to be protected by the security unit.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, comprising:
   a first memory chip, configured to be coupled to a host controller, and comprising:
      a first memory controller;
      a first data storage zone, coupled to the first memory controller, and represented by a first physical address range;
      a security unit, coupled to the first memory controller; and
      an address configuration unit, coupled to the first memory controller; and
   a second memory chip, coupled to the first memory controller, configured to be coupled to the host controller via the first memory chip, and comprising:
      a second memory controller; and
      a second data storage zone, coupled to the second memory controller, and represented by a second physical address range,
   wherein the address configuration unit records one or more relationships of a logical address range corresponding to the first physical address range and the second physical address range, the security unit is configured to encrypt and decrypt data in the first data storage zone and the second data storage zone.

2. The memory device according to claim 1, wherein the address configuration unit comprises a mapping table, the mapping table is configured to record the one or more relationships.

3. The memory device according to claim 1, wherein a plurality of logical address of the logical address range respectively comprises one or more size bits, the one or more size bits are configured to represent a size of the second data storage zone.

4. The memory device according to claim 1, wherein a plurality of logical address of the logical address range respectively comprises one or more arrangement bits, the one or more arrangement bits are configured to represent an order of the first physical address range and the second physical address range in the one or more relationships.

5. The memory device according to claim 1, wherein a first portion of the logical address range is mapped to the first physical address range, a second portion of the logical address range is mapped to the second physical address range, and the first portion and the second portion are discontinuous.

6. The memory device according to claim 1, wherein a first portion of the logical address range is mapped to the first physical address range, a second portion of the logical address range is mapped to the second physical address range, and the first portion and the second portion are continuous.

7. The memory device according to claim 1, wherein the first memory chip and the second memory chip is packaged in a multi-chip package.

8. The memory device according to claim 1, further comprising:
a third memory chip, coupled to the first memory controller, configured to be coupled to the host controller via the first memory chip, and comprising:
a third memory controller; and
a third data storage zone, coupled to the third memory controller, and represented by a third physical address range,
wherein the address configuration unit further records one or more relationships of a logical address range corresponding to the first physical address range, the second physical address range and the third physical address range.

9. A memory chip, comprising:
a first memory controller;
a first data storage zone, coupled to the first memory controller, and represented by a first physical address range;
a security unit, coupled to the first memory controller; and
an address configuration unit, coupled to the first memory controller,
wherein the memory chip is configured to be coupled between a host controller and another memory chip, the another memory chip comprises a second data storage zone, the second data storage zone is represented by a second physical address range, the address configuration unit records one or more relationships of a logical address range corresponding to the first physical address range and the second physical address range, the security unit is configured to encrypt and decrypt data in the first data storage zone and the second data storage zone.

10. The memory chip according to claim 9, wherein the address configuration unit comprises a mapping table, the mapping table is configured to record the one or more relationships.

11. The memory chip according to claim 9, wherein a plurality of logical address of the logical address range respectively comprises one or more size bits, the one or more size bits are configured to represent a size of the second data storage zone.

12. The memory chip according to claim 9, wherein a plurality of logical address of the logical address range respectively comprises one or more arrangement bits, the one or more arrangement bits are configured to represent an order of the first physical address range and the second physical address range in the one or more relationships.

13. The memory chip according to claim 9, wherein a first portion of the logical address range is mapped to the first physical address range, a second portion of the logical address range is mapped to the second physical address range, and the first portion and the second portion are discontinuous.

14. The memory chip according to claim 9, wherein a first portion of the logical address range is mapped to the first physical address range, a second portion of the logical address range is mapped to the second physical address range, and the first portion and the second portion are continuous.

15. The memory chip according to claim 9, further comprising:
a third memory chip, coupled to the first memory controller, configured to be coupled to the host controller via the memory chip, and comprising:
a third memory controller; and
a third data storage zone, coupled to the third memory controller, and represented by a third physical address range,
wherein the address configuration unit further records one or more relationships of a logical address range corresponding to the first physical address range, the second physical address range and the third physical address range.

16. A memory chip, comprising:
a first memory chip, comprising:
a first interface, configured to receive a command sequence, and to identify a memory operation;
a first controller circuit, operatively coupled to the first interface, and configured to decode the command sequence;
a first memory zone, coupled to the first interface and the first controller circuit; and
a security unit, operatively coupled to the first interface, and configured to verify the memory operation; and
one or more second memory chips, each of the one or more second memory chips comprising:
a second interface, coupled to the first interface; and
a second memory zone, coupled to the second interface;
wherein the first interface identifies a target memory zone from the command sequence for directing the memory operation to one of the first memory zone and the one or more second memory zones according to one or more relationships of a logical address range corresponding to a first physical address range representing the first memory zone and one or more second physical address ranges representing the one or more second memory zones, the first controller circuit executes the memory operation based on the target memory zone.

17. The memory chip according to claim 16, wherein the one or more relationships is recorded in one or more mapping tables.

18. The memory chip according to claim 16, wherein a plurality of logical address of the logical address range respectively comprises one or more size bits, the one or more size bits are configured to represent a size of the second memory zone.

19. The memory chip according to claim 16, wherein a plurality of logical address of the logical address range respectively comprises one or more arrangement bits, the one or more arrangement bits are configured to represent an order of the first physical address range and the second physical address range in the one or more relationships.

20. The memory chip according to claim 16, wherein a first portion of the logical address range is mapped to the first physical address range, a second portion of the logical address range is mapped to the second physical address range, and the first portion and the second portion are discontinuous.

21. The memory chip according to claim 16, wherein a first portion of the logical address range is mapped to the first physical address range, a second portion of the logical address range is mapped to the second physical address range, and the first portion and the second portion are continuous.

* * * * *